H. ROSENHEIM.
NON-REFILLABLE BOTTLE.
APPLICATION FILED JULY 9, 1915.
1,194,076.
Patented Aug. 8, 1916.
3 SHEETS—SHEET 1.
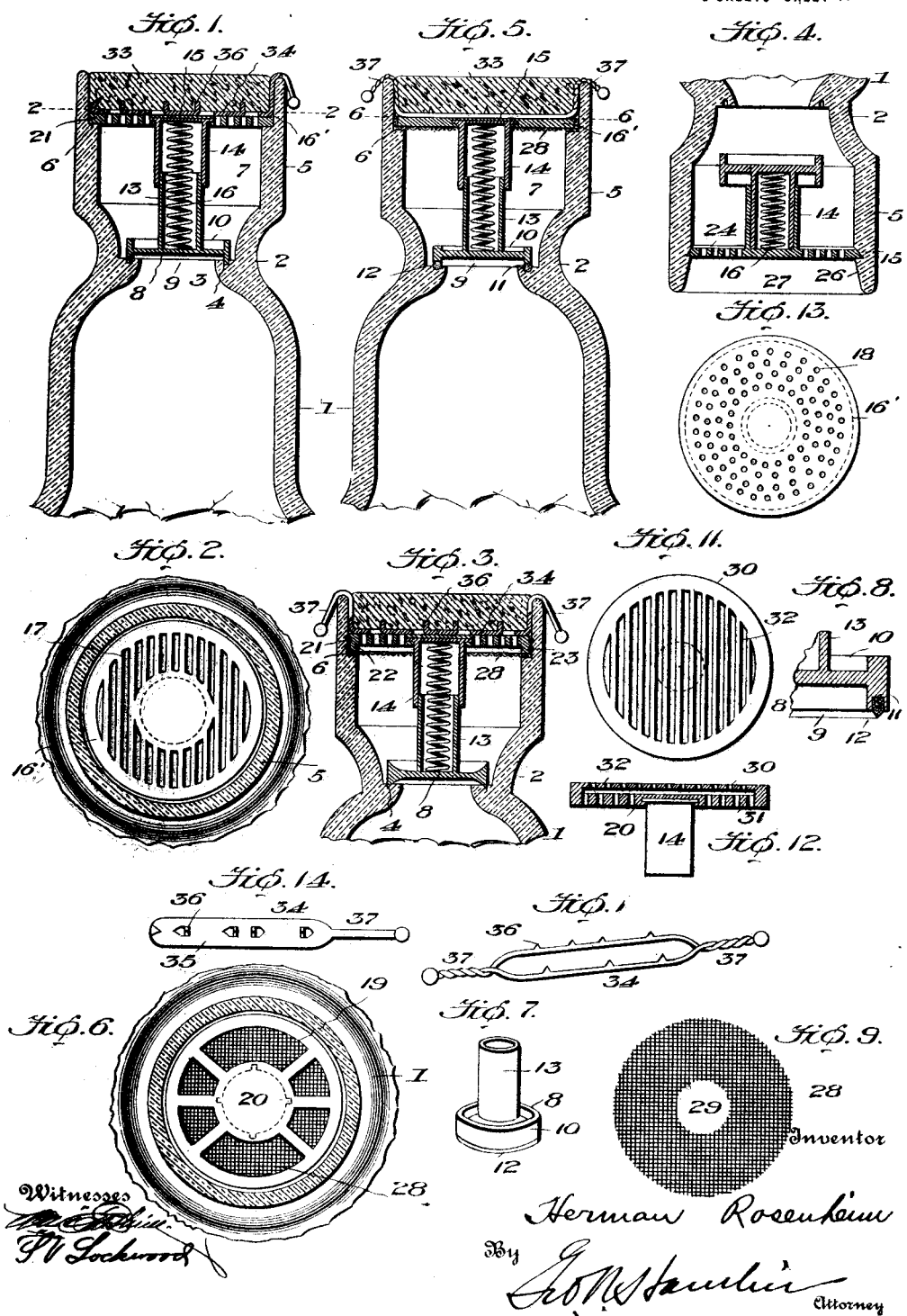

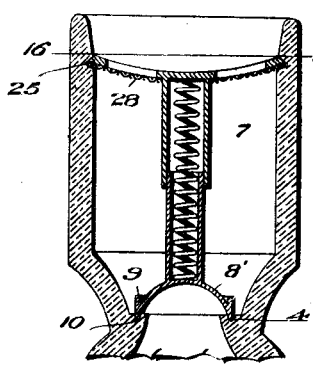
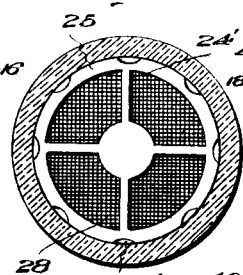
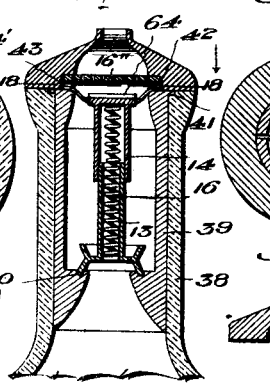
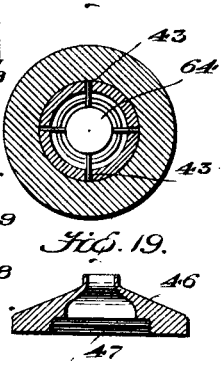
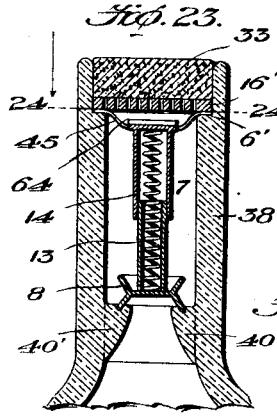
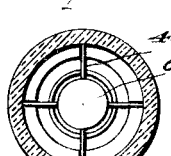

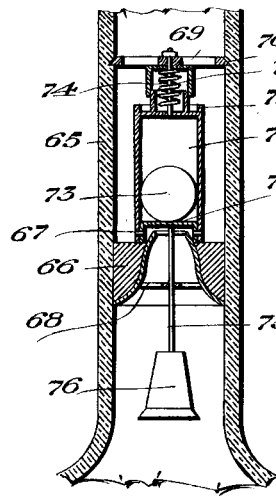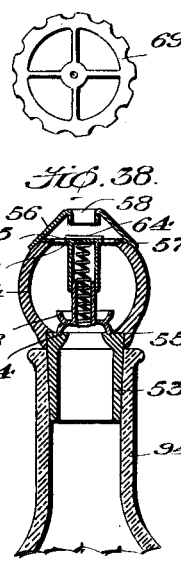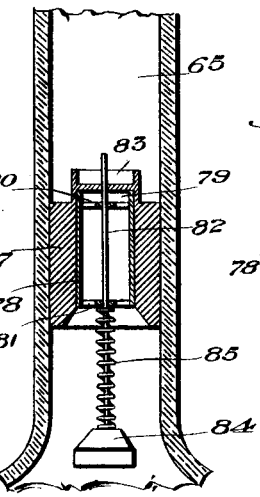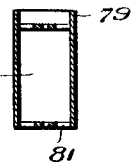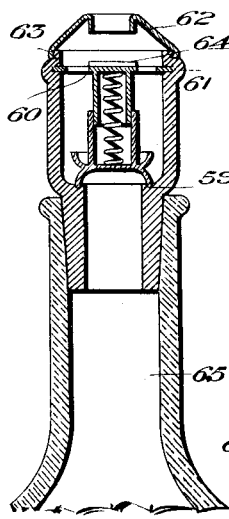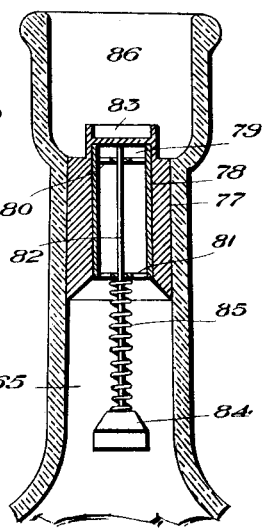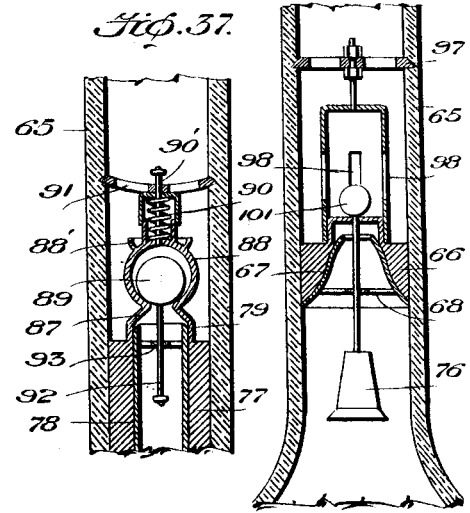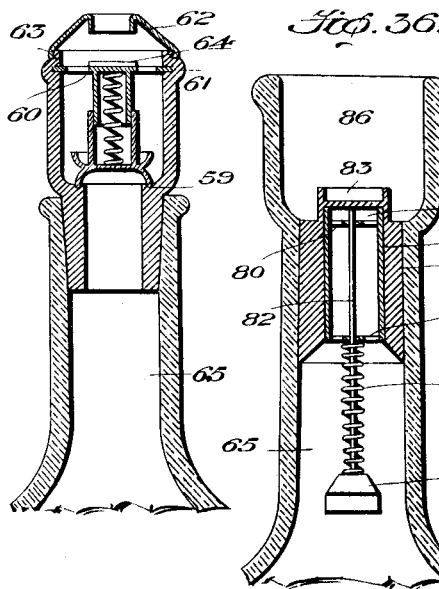

UNITED STATES PATENT OFFICE.

HERMAN ROSENHEIM, OF SAVANNAH, GEORGIA.

NON-REFILLABLE BOTTLE.

1,194,076. Specification of Letters Patent. Patented Aug. 8, 1916.

Application filed July 9, 1915. Serial No. 38,903.

*To all whom it may concern:*

Be it known that I, HERMAN ROSENHEIM, a citizen of the United States, residing at Savannah, county of Chatham, State of Georgia, have invented certain new and useful Improvements in Non-Refillable Bottles, of which the following is a specification.

My invention relates to non-refillable bottles.

The object of the present invention is the provision of improvements for preventing the refilling of bottles and like receptacles, and it comprehends embodiment either in the bottle as originally manufactured or in an attachment for ordinary bottles. In connection with my improvement there may be provided a special pouring cap or nozzle, and a closing or sealing cork or stopper and, if desired, a puller or extractor for such cork or stopper.

Being susceptible of wide modification, within the spirit and scope of the invention, I have set forth hereinafter, and illustrated in the accompanying drawings, several different forms which the generic aspect of the invention may assume, but this is done by way of illustration and not in restriction of the scope of the invention.

My invention, in its broadest aspect, comprises a cup-shaped valve and closing means therefor, a valve-seat with which said valve coöperates in an improved manner to effectually seat the valve, and a bottle-neck combined with the foregoing elements in a novel manner, said valve being adapted to open when the bottle is tilted or inverted and to close when restored to upright position.

In the accompanying drawings: Figure 1 is a vertical section showing the improvements embodied in one form in a bottle neck of special form; Fig. 2, a cross section on line 2—2, Fig. 1; Fig. 3, a section of a modification of the form of Fig. 1; Fig. 4, a similar view of another modification shown in inverted position; Fig. 5, a view like Fig. 1, of a further modification; Fig. 6, a section on line 6—6, Fig. 5; Fig. 7, a detail perspective of the valve of Fig. 5; Fig. 8, a fragmentary sectional view of the valve of Figs. 5 and 7; Fig. 9, a plan view of the gauze disk of Fig. 5; Fig. 10, a detail perspective of the cork extractor of Fig. 5; Fig. 11, a detail plan of another form of guard or grating; Fig. 12, a cross sectional view thereof; Fig. 13, a plan view of another form of grating or guard; Fig. 14, a detail of the puller or extractor of Fig. 1; Fig. 15, a detail vertical section of another modification; Fig. 16, a cross section on line 16—16, Fig. 15; Fig. 17, a vertical section showing the invention embodied as an attachment for ordinary bottles; Fig. 18, a section on line 18—18, Fig. 17; Fig. 19, a detail vertical section of the pouring cap or nozzle of Fig. 17; Fig. 20, a detail plan of the guard or grating of Fig. 17; Fig. 21, a similar view of the valve supporting means of Fig. 17; Fig. 22, a detail of the valve and its stem; Fig. 23, a vertical section of another modification; Fig. 24, a cross section on line 24—24, Fig. 23; Fig. 25, a vertical section of another modification; Fig. 26, a detail view showing an attachment for bracing the telescoping stem of the valve of any of the preceding or following figures; Fig. 27, a similar view of a modification for the same purpose; Fig. 28, a cross section on line 28—28, Fig. 26; Fig. 29, a detail section showing the invention applied to the upper end of an ordinary bottle neck; Fig. 30, a detail of another modification; Fig. 31, a cross section on line 31—31, Fig. 30; Fig. 32, a detail section of a modification showing a gravity-spring-closed valve; Fig. 33, a detail of the spider of Fig. 32; Fig. 34, a detail of another modification, showing a spring-closed valve; Fig. 35, a detail of the shell of Fig. 34; Figs. 36 and 37, details of further modifications; and Figs. 38, 39 and 40, details of adaptations of the modifications of Figs. 29, 30 and 32, respectively.

Referring to Figs. 1, 3, 4, 5 and 15, the bottle neck is of special form, the said neck 1 being contracted at 2 and provided with an internal annular shoulder 3 at its narrowest point, said shoulder having an annular groove 4 constituting a valve-seat. In said figures there may be provided, except in Figs. 4 and 15, an enlarged portion providing a shoulder 6. Preferably the lower portion of the upper part 5 of the neck is of such diameter that the annular outlet space between the valve and the neck is of at least the same area as the space encompassed by the shoulder 3 so that the contents of the bottle can be readily emptied without interference by the valve.

The valve 8 is cupped on both its lower and its upper side and is provided with a depending annular flange 9 which is received in the seat 4 and with an upwardly extending annular flange 10. The upper cup thus provided is adapted to catch any liquid poured into the neck and into the chamber 7 in an attempt to refill the bottle, the weight of this liquid assisting in reseating the valve and foiling the attempt at refilling. When the bottle is inverted, the pressure of the liquid in the bottom cup assists in opening the valve, the valve appearing as in Fig. 4 when the bottle is inverted. The cups of the valve of Fig. 3 while differently shaped, have the function aforesaid.

To afford a more perfectly sealed joint and seating effect, the bottom flange 9 may be provided with an annular groove 11 in its edge for the reception of a rubber or other suitable gasket, washer, or packing 12 so shaped that it will readily enter the seat 4, as shown in Figs. 5, 7, and 8.

Rising from the valve is a tubular stem section 13. Depending in the chamber 7 and held and guarded in any of the various ways shown in the drawings is a tubular guide 14 whose upper end is closed at 15. A coil spring 16 is wholly contained within the stem section 13 and the guide 14 and completely housed thereby at all times, said spring tending to keep the valve closed on the seat 4. The spring is of such strength that while it normally keeps the valve closed, it will readily yield to the pressure of the fluid in the bottle when the latter is inverted, the valve then opening, as shown in Fig. 4. Immediately the bottle is restored to normal upright position, the spring reseats it.

The valve chamber 7 is closed at the top to prevent tampering, by a disk 16' of any suitable material such as glass, porcelain, hard rubber, metal, or any combination of these or other materials. So long as this disk has suitable openings to permit the outward passage of the fluid, the form or shape of the openings is immaterial and they may be slots 17, as in Figs. 1 to 3, inclusive, or perforations 18, as in Fig. 13, or segmental ports 19, as in Fig. 6. The disk serves as a guard for the valve, a means for permitting passage of the fluid, and a support or suspending means for the valve stem guide 14. The guide 14 may have lugs 20 or other suitable means for permanently anchoring it in the disk 16', if desired. If the disk 16' is of glass, porcelain, or the like, it may be molded over the lugs 20. In any event, the connection may be a permanent one which cannot be broken loose from the upper face of the disk. The guide 14 and disk 16' may be formed integral with each other.

Any suitable means may be employed for securing the disk 16', as for instance, a binding 21 of cement, or, the disk may have a depending flange 22, as shown in Fig. 3 and to increase the binding effect of the cement, grooves or indentations 23 may be provided in the periphery of the disk and the interior of the bottle neck.

In Fig. 4, the perforated disk 24 may be of metal or other flexible material and is sprung into the bottle neck and then expands into an annular groove 25. Suitable beveling at 26 facilitates this operation. Once in position, the disk is securely held. The guide 14 may be permanently connected in any way to the disk or formed integral therewith, as at 27.

In connection with the grating, as for instance, form such as shown in Figs. 5 and 15, there may be provided a diaphragm of wire netting or gauze 28, Fig. 9, which is seated on the shoulder 6 and cemented or otherwise suitably secured in place under the grating or guard. The central opening 29 in the gauze 28 fits around the guide 14. The guard or grating of Figs. 11 and 12 embraces molded or otherwise formed upper and lower plates 30 and 31, spaced apart and having suitable slots or apertures, those of one plate being arranged in non-registering relation with those of the other plate so that the insertion of a tampering instrument into the valve chamber is prevented.

The modification of Figs. 15 and 16 is somewhat similar to that of Fig. 4 except that the guard has a spider-like form composed of cross-pieces 24' and an annular portion 25' provided with slits 26' giving great facility for inserting and snapping into the internal annular groove 25. In this form the wire gauze 28 is positioned below the securing disk or guard and prevents an instrument being inserted into the chamber 7. The valve is arched on its upper face at 8' but as the flanges 9 and 10 are provided, the action of the fluid in both pouring and attempting to refill the bottle is the same as heretofore set forth. The flange 10 fits in the seat 4.

In the forms of the invention described, and those hereinafter set forth after the bottle has been filled, it may be closed by a cork or other stopper 33. While not essential, there may be provided a pulling or extracting device 34 for the stopper 33, said device being of the form shown in either Fig. 10 or 14. In Fig. 10 the puller is of wire and provided with points which enter the bottom of the cork, as shown in Fig. 5 and has grips 37 to be grasped by the fingers. In Fig. 14, the puller is of sheet metal 35 having struck-up lugs 36 which enter the bottom of the stopper, as shown in Fig. 1. Other extractors could be employed or entirely omitted. The extractor can be used over and over again as the cork or stopper is only withdrawn from time to time to permit fluid to be poured from the bottle.

Referring to Figs. 17 to 22, inclusive, the invention is shown as an attachment for a bottle having an ordinary neck 38. Fitted within the neck 38 and cemented or otherwise secured thereto, is a shell 39 having a valve seat 40 of the same general form as the valve seat 4. The upper end of the shell 39 may have a flange 41 to rest in the mouth of the bottle neck 38 and is provided with a nipple 42, preferably screw-threaded, and which has notches or slots 43 cut downwardly from the upper extremity thereof. The means for supporting the valve consists of a spider whose central part 44 constitutes the upper end of the guide 14 and whose arms 45 have their extremities received in the slots 43. The entire structure is thus suspended from the upper end of the shell 39. In all forms of the invention employing this spider, the ends of the arms 45 may, if desired, extend up and over the mouth of the neck to prevent the spider from falling down into the neck. Resting upon the nipple 42 is the perforated guard disk 16″, Fig. 20, similar to the disk 16′. A pouring nozzle 46, Fig. 19, may be provided with internal screw-threads 47 engaged with the screw-threads on the nipple 42 and serving to hold the guard 16″ and the spider in position or be otherwise secured. The nozzle 46 also rests against the upper end of the neck 38 and holds the shell 39 steady. Suitable cement or other binding or fastening means connects the nozzle 46 to the bottle neck 38 and cement or other fastening means may be provided to hold the spider and the guard in the nozzle or to the chamber of the neck attachment 39, the threaded or extended portion of the same fastening the nozzle. Any one, or two, of the various guards hereinbefore set forth may be employed in the form shown in Fig. 17.

Referring to Figs. 23 and 24, the bottle neck 38 is provided with an integral valve seat 40′. The bottle neck may be of the usual size and shape of an ordinary bottle, or the upper end of the neck may be enlarged and provided with a shoulder 6′ which may, or may not, be provided with notches similar to the notches 43 for the accommodation of the ends of the spider arms 45. The spider construction is the same as that of Fig. 21 and there is superposed thereon a guard disk 16″ like the disk of Fig. 20. A cork or stopper 33 may be provided and, if desired, a puller or extractor employed in connection therewith. The spider 45 and the guard 16″ are suitably cemented or otherwise suitably secured in the bottle neck. The valve structure is the same as that of Figs. 17 and 22.

In the modification shown in Fig. 25, any bottle neck 38 is provided with a separately constructed valve seat 48 which is inserted to a suitable distance in the neck and secured by cement or in any desired manner, as by fins and notches. The valve seat has an annular channel as in the other forms. The upper end of the bottle neck is provided with a protruding nipple, such as an externally screw-threaded nipple 49 corresponding to the nipple 42 and a pouring nozzle 46 similar to that of Fig. 19 is screwed onto the nipple 49 and serves as a means for securing the spider arms 45 in the notches in the nipple and for holding the guard disk 16″ in position. These parts are connected by cement or other suitable binding or fastening means to prevent tampering. The nipple 49 may be a separate piece cemented or otherwise suitably secured to the neck 38, as shown by dotted lines 49′.

In the modification shown in Fig. 26, I have illustrated how the guiding tube 14 and the valve stem 13 can be braced or steadied without interfering with relative sliding. This is accomplished by the provision of an external tube 50 secured to and rising from the valve and telescoping over and being loosely mounted on the guide 14.

Another form of bracing or guiding for the valve is shown in Fig. 27. Here there is provided a cage of separate wires 51 which are secured to the spider arm 45 and to a washer or ring 52 on the seat 48, said ring or washer having an opening loosely surrounding the valve. Other bracing arrangements might be employed.

In Fig. 29, there is shown a modification by which an ordinary bottle neck 53 is equipped with my non-refillable attachment which is superposed thereon and arranged exteriorly thereof. I provide a shell 54 which is seated on the upper end of the bottle neck at 55 and is suitably connected thereto in any desired manner, such as by the use of cement. Preferably, the upper end of the neck is provided with an annular groove or valve seat 4. The valve 8 is of the double cupped form previously described and is suspended from a spider of the form shown in Fig. 21. The arms 45 of the spider rest in notches in the upper ends of the shell 54. The pouring nozzle 56 is secured at 57 in any preferred manner so that it will be permanently connected to the shell 54 and will hold the spider arms 45 in position.

In the modification shown in Fig. 30, the seat 59 is of the same general form as that of Figs. 1, 5 and 15. The spider construction 60 is substantially like that appearing in Fig. 16 and is sprung into an annular channel 61 in the interior of the bottle neck. The pouring nozzle 62 is substantially like that shown in Fig. 29 at 56 and is secured to a bead 63 in the same manner.

As previously explained, the materials that enter into the modifications of Figs. 17 to 31, may be any that are suitable. For instance, the guarding disks may be of porcelain, glass, hard rubber or metal, or any combination of these. The spider may likewise be of any of these materials and so may the pouring nozzles.

In these modifications I may prefer to employ a loose disk 64 of any suitable hard material, such as glass, porcelain, or the like, which is not susceptible of being easily punctured or drilled and to place said disk above the spider and below the guard or screen. The purpose of this disk is to afford a barrier between the central portion 44 of the spider and the exterior or pouring opening to prevent drilling through the spider in an attempt to tamper with the bottle.

In Figs. 32, 33, there is shown a modification which may dispense with the spring 16 heretofore described and utilize gravity alone to close the valve. If desired, a spring 74' may be employed to assist in closing the valve. The bottle neck is shown at 65 which has an internal valve seat 66 preferably formed separate and inserted in and secured to the bottle neck. This seat is provided with a raised annular portion 67 and may have cross-pieces 68 in its lower portion. A spider 69 of the general form shown in Figs. 15 and 21 and is flat or concave, is sprung into a notch or internal annular channel in the neck, but the guide tube 14 and the valve stem 13 and spring 16 are entirely dispensed with. The valve 71 is an inverted cup secured within and to a tube 72 in which is a ball 73 which is free to move in said tube between the top of the latter and cup 71. The tube is secured to a stem 74 slidable through an aperture in the spider 69. The valve 71 is adapted to encompass the seat 67 and the ball 73 assists the fluid in opening the valve and adds weight to the valve and tube 72 to impactively close the valve when the bottle is in standing position. To assist in opening the valve, I may provide a stem 75 secured to the bottom of the valve 71 and sliding through the guide 68 and carrying an inverted cup 76 which is adapted to receive the fluid when the bottle is inverted and assist the ball 73 in opening the valve. The parts 75, 68 and 76 may be dispensed with in this modification, if preferred. An outwardly facing cup 72' may be provided on tube 72, if desired.

Referring now to the modification shown in Figs. 34, 35, in the bottle neck 65 there is placed and suitably secured a tubular plug 77 which may be of cork, rubber, or other material and in which is permanently fixed a tube 78 whose upper end projects above the plug and constitutes a valve seat 79. The plug carries guides 80 and 81 for the valve stem 82. On the upper end of the valve stem is a valve 83 which has upper and lower cups and is of the same general form as the valve of Figs. 1, 4, 5, and operates in the same manner as the double cupped valves of other modifications. The weight of the fluid in the lower cup when the bottle is inverted, assists in opening the valve and, if an attempt is made to refill the bottle, the fluid received in the upper cup assists in closing the valve. On its lower end, the stem 82 carries an inverted cup 84 which receives the liquid when the bottle is inverted and assists in opening the valve 83. A coil spring 85 is interposed between the cup 84 and the guide 81 and is adapted to normally keep the valve 83 telescoped over the seat 79, but yields to the weight of the fluid when the bottle is inverted.

In Fig. 36, I have shown a construction substantially similar to that of Figs. 34, 35, as located in the upper portion of a bottle neck and just below the enlarged mouth 86. When the construction of these figures is used in a large necked bottle, where the proportion of outflow would be ample to afford the necessary weight in the valve cup which seats the valve, the lower valve cup could be dispensed with and the spring would then be arranged higher up. The construction can be employed when the bottle is originally made or used as a separate attachment.

In the disclosures of Figs. 32–37, it is to be understood that means such as the guard disk or grating or gauze may be employed above the valve to prevent access thereto although such is not shown in these figures.

In the modification shown in Fig. 37, the lower cup such as shown at 84 is dispensed with, but may be used if preferred. The plug or stopper 77 has the internal shell 78 and the valve seat 79. The valve 87 telescopes over the seat 79 and is provided with a globular shell 88 containing a loose ball 89. The stem 90 at the upper end of the shell is guided in the spider 91 similar to the spider 69 and the lower stem 92 slides up and down in a guide 93. In this modification, the ball 89 may be dispensed with and the shell 88 can be solid to provide the necessary weight. If preferred, a spring 90' may be used to assist in closing the valve. An outwardly facing cup 88' may be provided on the shell 88, if desired.

In Fig. 38, I have shown how the modification of Fig. 29 may be adapted to the neck of an ordinary bottle. The part 53 is tapered to fit within the usual internal taper of an ordinary bottle neck 94 and is suitably secured thereto in any preferred manner.

In Fig. 39, the complete structure is fitted within and suitably secured to the neck 94 of an ordinary bottle.

In Fig. 40, there is shown another modification, a variation of the form of Fig. 32. In this form, the tube 95 is provided with a fixed stem 96 which is fixed to a spider 97 corresponding to the spider 69. The tube 95 is thus held firmly and rigidly with its end telescoping over, but not touching, the upper end of the annular portion 67 of the valve-seat 66. The tube 95 is provided with openings or perforations 98. Slidable up and down in the tube 95 is an inverted cup valve 99 which has a stem 100 slidable through the guides 68. Surmounting the cup valve 99 is a weight 101 which is preferably fastened to the said cup valve. In opening and closing, the cup valve slides in the tube 95; the weight closes the cup valve when the bottle is in its upright position, so that the cup valve then rests on the seat 66 around the upper part 67.

As all forms of my invention are susceptible of modification, I do not limit myself to the details of construction and specific combinations of parts hereinbefore set forth, but consider myself entitled to all changes falling within the spirit and scope of the invention.

In the specification and claims where reference is made to the invention as pertaining to a "non-refillable bottle," I intend such expression to include the embodiment of my improvements either as a part of a bottle or as an attachment or attachments for making bottles non-refillable.

Having thus described my invention, what I claim as new and desire to secure by Letters Patent, is:—

1. In a non-refillable bottle, the combination with a bottle neck having an internal discharge port communicating with the interior of the bottle and provided with a valve-seat surrounding said port, said neck also having an enlarged chamber into which the discharge port directly opens, said chamber permitting freedom of fluid discharge thereinto and therefrom, a cup-shaped valve which faces the interior of the bottle and whose rim is adapted to telescope with the valve-seat, said valve being adapted to close, or to fully uncover or unseat from, said discharge port, said valve also having a cup within the enlarged chamber aforesaid, the aforesaid cups serving to assist in opening and closing the valve, guiding means for the valve adapted to determine its path of movement when it opens and closes, closing means for the valve, said enlarged chamber providing a free space around the valve when the valve is either opened or closed, and means for guarding the outlet portion of the chamber without interfering with the free passage of the fluid to the mouth of the bottle.

2. In a non-refillable bottle, the combination with a bottle neck having an internal discharge port communicating with the interior of the bottle and provided with a valve-seat, said neck also having an enlarged chamber into which the discharge port directly opens, said chamber permitting freedom of fluid discharge thereinto and therefrom, a valve adapted to close, or to fully uncover or unseat from, said discharge port, and having cups respectively facing toward the internal discharge port and the outlet of the neck, closing means for the valve, guiding means for the valve adapted to determine its path of movement when it opens and closes, said enlarged chamber providing a free space around the valve when the valve is either opened or closed.

In testimony whereof, I hereunto affix my signature.

HERMAN ROSENHEIM.

Copies of this patent may be obtained for five cents each, by addressing the "Commissioner of Patents, Washington, D. C."